United States Patent [19]
Vit

[11] 3,921,297
[45] Nov. 25, 1975

[54] CHEMICALLY ACTIVE DECAY ATTACKING LIQUID ADMINISTERING APPARATUS AND FATIGUE RELIEVING CONNECTION THEREFOR

[76] Inventor: Jaroslav Vit, 40 Partridge Run, Belle Mead, N.J. 08502

[22] Filed: Oct. 15, 1974

[21] Appl. No.: 515,091

[52] U.S. Cl.................... 32/40 R; 285/98; 285/174; 285/281; 285/321
[51] Int. Cl.² ...................... A61C 3/00; F16L 27/08
[58] Field of Search ............ 285/174, 281, 280, 98, 285/276, 321; 32/22, 40 R; 204/81

[56] References Cited
UNITED STATES PATENTS

| | | | |
|---|---|---|---|
| 2,227,566 | 1/1941 | Angell | 32/22 X |
| 2,384,360 | 9/1945 | Allen et al. | 285/98 |
| 2,450,581 | 10/1948 | Couty | 285/280 |
| 2,907,590 | 10/1959 | Oswald | 285/281 X |
| 3,314,695 | 4/1967 | Perry | 285/276 |
| 3,367,681 | 2/1968 | Braukman | 285/281 X |
| 3,537,652 | 11/1970 | Pearl | 285/98 X |
| 3,776,825 | 12/1973 | Vit | 204/81 |
| 3,799,589 | 3/1974 | Boelkins | 285/281 |
| 3,840,264 | 10/1974 | Bennett | 285/98 |

*Primary Examiner*—Thomas F. Callaghan
*Attorney, Agent, or Firm*—Cushman, Darby & Cushman

[57] ABSTRACT

Apparatus for administering chemically active decay attacking liquid including an applicator and handle therefor, a delivery hose, and a rotary coupling between the delivery hose and handle for relieving fatigue of materials connecting the hose and handle. The rotary coupling includes first and second connecting members, one member (preferably the one connected to the delivery hose) having an elongated tubular portion thereof that extends completely through the opening in the other connecting member and is held in that position by a retaining means. Disposed between cooperating shoulder portions of the connecting members and surrounding the elongated tubular portion is an anti-friction and sealing ring, such as a Teflon ring, and a spring retaining means for securing the ring around the elongated portion. A friction free liquid-tight coupling between two relatively rotatable members is thus provided.

9 Claims, 3 Drawing Figures

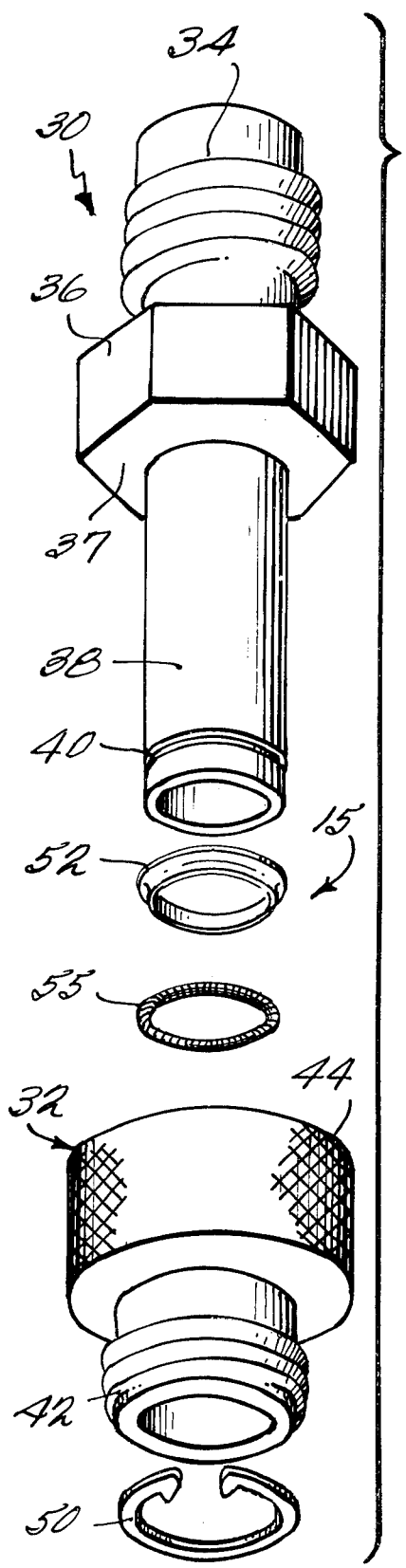
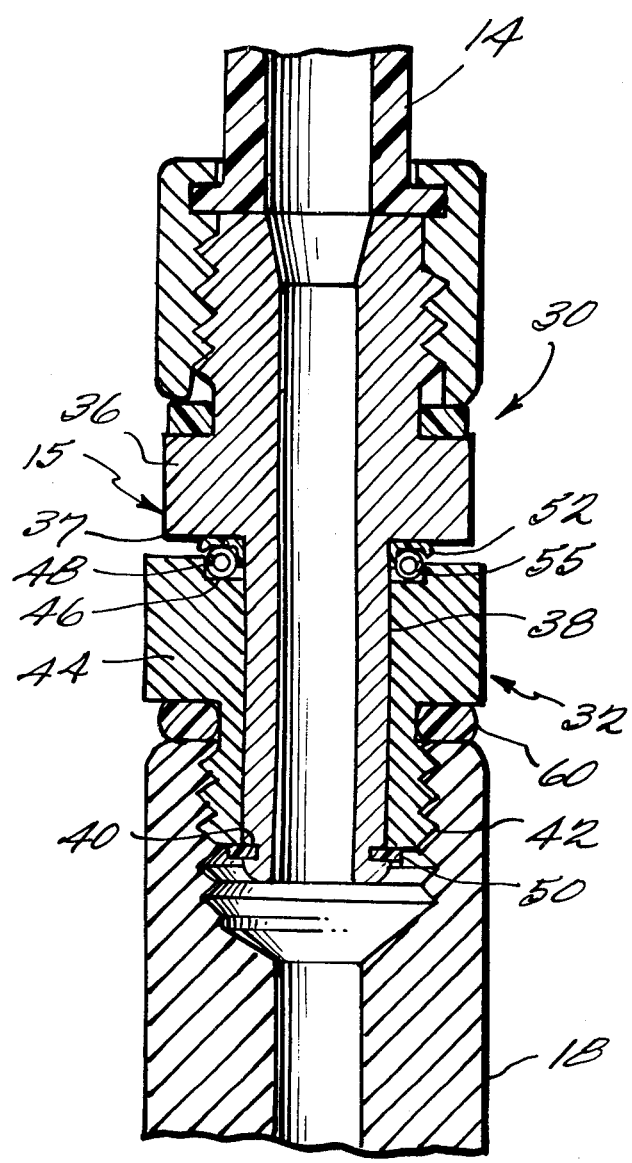
Fig.2
Fig.3

CHEMICALLY ACTIVE DECAY ATTACKING LIQUID ADMINISTERING APPARATUS AND FATIGUE RELIEVING CONNECTION THEREFOR

BACKGROUND AND SUMMARY OF THE INVENTION

The invention relates in general to the application of chemically active decay attacking fluid to dental caries and dental plaque, and in particular to the provision of a rotary coupling between a standard supply hose and fluid administering tool.

N-monochloroglycine solutions having a pH of 8–12 and other N-haloamine solutions have been recognized to have the capability of dissolving dental plaque and dental caries while not adversely affecting healthy dental structures. Some basic compositions having the above-mentioned capabilites are disclosed in commonly assigned copending application Ser. No. 307,835 filed Nov. 20, 1972, which is a continuation-in-part of application Ser. No. 117,822, filed Feb. 22, 1971, now abandoned, and application Ser. No. 197,966, filed Nov. 11, 1971, now abandoned, although the present invention is not restricted to use with the liquids so described, but is utilizable with any chemically active decay attacking fluid. Suitable solutions include, but are not limited to, solutions of N-chloroglycine, N-bromoglycine, N-iodoglycine, N-chlorosarcosine, N-bromosarcosine, N-iodosarcosine, N-chloro alpha amino isobutyric acid, N-chlorotaurine, N-bromotaurine, N-iodotaurine, N-chloro ethanolamine, N-ethanolamine, N-ido-N-acetyl glycine, N-bromo, N-acetyl glycine, N-chloroalanine, N-chloro beta alanine, N-bromo beta alanine, N-chloroserine, N-bromoserine, N-iodoserine, N-chloro-N-phenylalanine, N-chloroisoleucine, N-chloronorvaline, N-chloroleucine, N-bromoleucine, N-iodoleucine, N-chloroproline, N-bromoproline, N-iodoproline, N-chlorohydroxyproline, N-chloro omega aminoundecanoic acid, N-chloroaspartic acid, N-bromoaspartic acid, N-chloroglutamic acid, N-iodoglutamic acid, N-chlorovaline, N-chlorotyrosine, N-bromotyrosine, N-iodotyrosine, N-chlorothreonine, N-chlorocysteine, N-chlorocystine, N-chloromethionine, N-bromomethionine, N-chlorotryptophane, N-chlorohistidine, N-chloroargenine, N-chloroglutamine, N-bromoglutamine, N-chlorolysine, N-chloro gamma aminobutyric acid, N-chloro alpha, epsilon diaminopimelic acid, N-chloro ornithine, N-chloro hydroxylysine, N-chloroanthranilic acid, N-chloro p-aminobenzoic acid, N-chlorosulfamic acid, N-chloro phenylsulfamic acid, N-chloro aminopropanesulfonic acid, N-chloropropanolamine, N-chlorodiethanolamine, N-chloro ethylene diamine tetraacetic acid (in this compound the nitrogen atom apparently functions as a quaternary nitrogen).

A means for applying the decay attacking chemically active fluids mentioned above is described in U.S. application Ser. No. 312,507 to J. Vit, filed Dec. 6, 1972, and commonly assigned with the present application; and which is hereby incorporated by reference in the present application.

In said U.S. application Ser. No. 312,507 there is provided a dental system for applying decay attacking chemically active fluids in such a manner that the end result is rapid and effective removal of dental debris, especially caries. Such dental system comprises a jet forming mens, a pump having an outlet communicating with said jet forming means, and means for repeated operation of the pump such that in each cycle of operation there is a period of application of pressure feed followed by a period of non-application of pressure feed. The dental system is operated in a manner such that there is applied to the caries portion of a tooth a pulsating high velocity liquid jet stream, the pulsations being such that in each cycle the difference between the highest and a lowered pressure applied to the tooth, the the respective periods for which the tooth is under highest pressure and the lowered pressure, cause it to be mechanically stressed and then completely relaxed.

Another means of applying the decay attacking chemically active fluids mentioned above is shown in U.S. Pat. No. 3,776,825, which is commonly assigned with the present application, and which is hereby incorporated by reference in the present disclosure. Such conventional apparatus includes a fluid delivery means, such as a flexible hose, for delivering such fluid from a source of supply to an applicator tool such as a hypodermic neelde having a handle portion. Since the applicator tool must be maneuvered around so that the delivery orifice thereof is located in position to direct a stream of fluid onto dental caries or plaque, failure often occurs at the connection between the flexible hose delivery means and the applicator tool due to materials fatigue. According to the teachings of the present invention, this fatigue is relieved by providing a rotary coupling between the conventional flexible hose and the applicator tool which results in longer life of the apparatus.

Many rotary couplings for fluid delivering means have been known in the past, such as shown in U.S. Pat. Nos. 3,367,681, 3,408,095, 3,314,695, 2,480,174, and 2,450,581, however none are as completely satisfactory in this particular dental tool environment as the rotary coupling used in the apparatus of the present invention. According to the teachings of the present invention, a tubular connecting member is connected to each of the fluid delivery means and the applicator tool, one of the members having an elongated portion thereof that extends completely through the other tubular connection member. A snap ring or other suitable means holds the elongated portion in its extending-through position relative to the other connecting member. In this way — and additionally by connecting the tubular member having the elongated portion of the fluid delivery means — leakage of fluid through the coupling is prevented without the necessity of utilizing expensive sealing means.

Each of the tubular connecting members has a shoulder portion thereof that is disposed in a plane generally perpendicular to the axis of the tubular members, which shoulders cooperate to sandwich an anti-friction and sealing means therebetween. The anti-friction means preferably is a Teflon ring shaped so that it is adapted to receive a spring-retaining means. The Teflon ring reduces the friction between the opposed shoulder portions of the tubular connecting members to facilitate relative rotational movement therebetween while still allowing them to be tightly retained with respect to each other so that expensive sealing means are not required.

It is the primary object of this invention to provide improved apparatus for administering decay attacking chemically active fluid to dental caries and plaque. This and other objects of the invention will become clear from an inspection of the detailed description of the invention and appended claims.

BRIEF DESCRIPTION OF THE INVENTION

FIG. 2 is an exploded view of the members comprising the rotary coupling in the apparatus of the present invention;

FIG. 3 is a cross-sectional view of the coupling for the apparatus of the present invention is assembled relation.

DETAILED DESCRIPTION OF THE INVENTION

Figure 1:
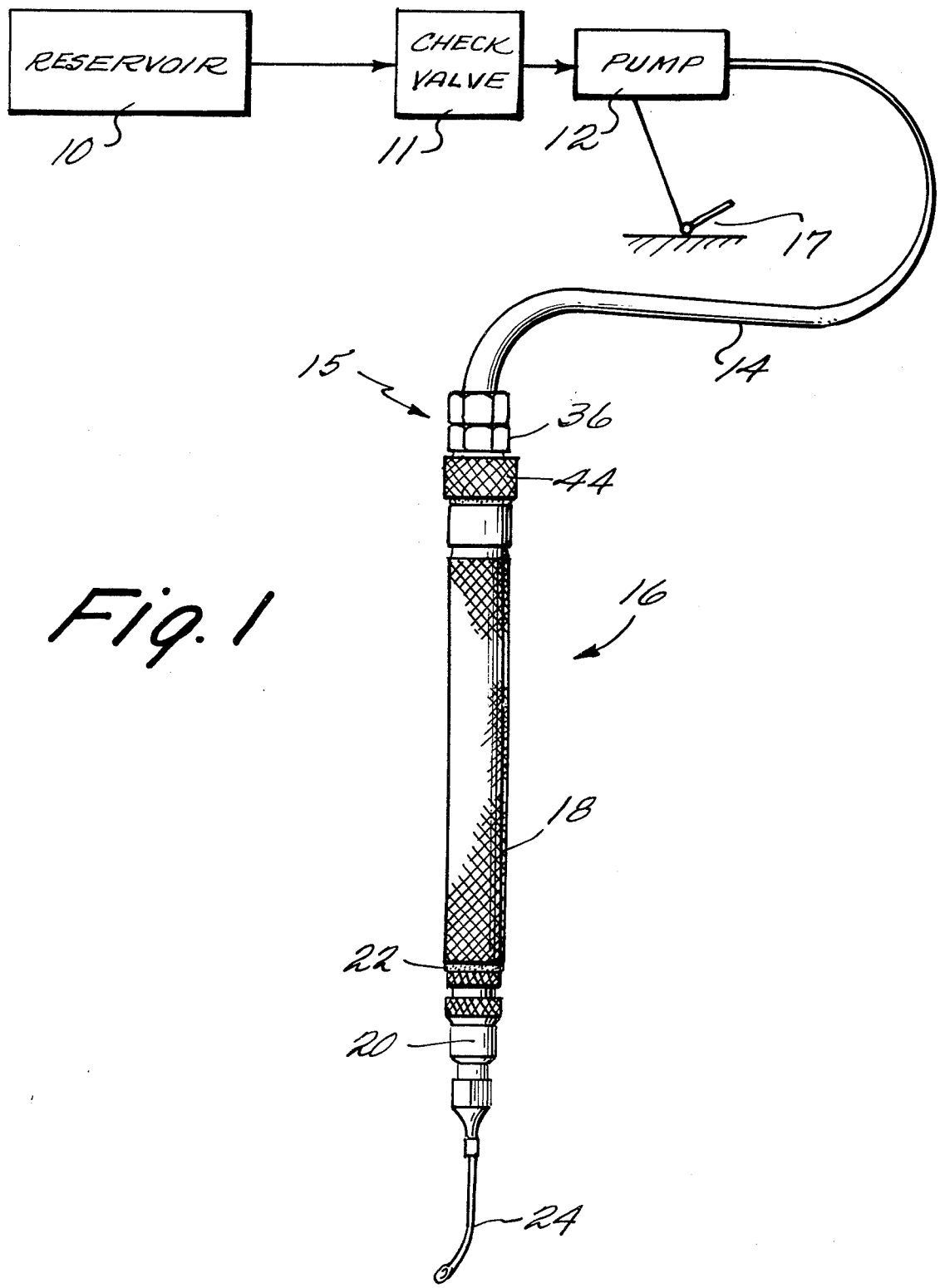
FIG. 1 is a perspective diagrammatic view of apparatus for administering decay attacking fluid to dental caries according to the present invention.

Apparatus for administering chemically active decay attacking fluid according to the present invention is shown in FIG. 1. The conventional apparatus includes a reservoir 10 for the liquid, a check valve 11, a pump 12 controlled by a foot-operated switch or the like 17. In fluid communication with the handle 16 is a fluid delivery means 14 — a flexible hose as shown in the drawings. The fluid delivery means 14 is connected by a rotary coupling — shown generally at 15 — to a conventional fluid administering tool, shown generally at 16. The tool 16 preferably comprises a handle portion 18, connected via an O-ring 22 to a removal applicator mounting portion, 20, which mounting portion 20 in turn removably receives an applicator 24 which is preferably a spoon excavator such as shown in commonly assigned application Ser. No. 452,649 filed Mar. 19, 1974, or which may be a hypodermic needle, such as shown in the above-mentioned U.S. Pat. No. 3,776,825, or the like.

The rotary coupling 15 allows relative movement between the hose 14 and the applicator handle 18 while securely attaching them to each other. The provision of relative rotary movement reduces the fatigue at that connection with a subsequent increase in the life of the components, and in addition makes the tool 16 in general more maneuverable. The coupling allows the handle to rotate without twisting of the flexible hose. Twisting of the hose requires substantial effort of the dentist and this interferes with the subtle operation in the human mouth. As shown most clearly in FIGS. 2 and 3, the coupling 15 comprises a first tubular connecting member shown generally at 30, adapted to be connected to the hose 14, a second tubular connecting member, shown generally at 32, adapted to be connected to the tool 16, a Teflon anti-friction member 52 with retaining spring 55 therefor adapted to be received between the connecting members 30, 32 and a spring-clip 50 adapted to retain the elements of the coupling in assembled relationship. Although it is preferred that the member 30 be attached to the hose 14 and that the member 32 be attached to the tool 16 (for reasons which will be hereinafter explained) the apparatus could be adapted so that the hose 14 was connected to member 32 and the tool 16 connected to the member 30.

The first tubular connecting member 30 comprises a portion 34 adapted to be connected to the hose 14, an enlarged middle portion thereof adapted to be grasped by a tool or hand to disconnect the member 30 from the members to which it is connected, and an elongated tubular portion 38. As shown in the drawings, the portion 34 is screw-threaded for easy attachment to screw-threaded interior portions of conventional fluid delivery hoses; however it is understood that other means for providing connection between the fluid delivery means and the member 30 may be provided. Disposed on the portion 36 is a first shoulder 37 adapted to operatively cooperate with a corresponding shoulder on the second connecting member, said shoulders being disposed in a plane generally perpendicular to the axis of the tubular portion 38. Formed on the end of the portion 38 remote from the portion 36 is a groove 40 adapted to receive the spring-clip 50 or the like to retain the connecting members in assembled relationship without hindering relative rotational movement between the connecting members.

The second connecting member 32 includes an enlarged portion 44 adapted to be grasped by a tool or hand for disconnecting it with members with which it is in assembled relationship, and a portion 42 adapted to be connected to a tool 16. As shown in the drawings, as with fastening portion 34 of first tubular connecting member 30, portion 42 has exterior screw-threads formed thereon in order to cooperate with conventional interiorly threaded tools, however other suitable connecting portions could be used. The portion 44 has formed on the face thereof remote from the portion 42 a shoulder 46 disposed in a plane generally perpendicular to the axis of the tubular portion 38, which shoulder is recessed in the face of the portion 44, having a generally circular lip portion 48 therearound.

Adapted to be disposed between the members 30 and 32 when the coupling components 15 are assembled is an anti-friction and sealing member 52. Preferably, the member 52 is formed of Teflon or like anti-friction material that will not degrade under adverse conditions, which member is formed with a generally U-shaped cross-section (see FIG. 3) so that it may receive a suitable spring-retaining means, such as garter spring 55. The member 52 allows free relative rotational movement between the connecting members even though they are held pressed together by the spring clip 50.

As can readily be seen from an inspection of the drawings, when the components of coupling 15 are assembled, the elongated tubular portion 38 of the first connecting member 30 extends through the second tubular connecting member 32 so that the groove 40 therein is on the opposite side of the member 32 from the portion 36 of member 30. The spring-retaining (or C-clip) means 50 is then placed over the portion 38 so that it is received in the groove 40, thereby maintaining the members 30, 32 in assembled relationship. In this way, fluid delivered from the line 14 will be conducted straight to the hollow interior of tool handle 18 without ever passing past an opening that must be sealed with expensive sealing means. To even more positively insure that no liquid will leak from the coupling 15, the member 30 having the elongated extension 38 is disposed on the line 14 from which the liquid under pressure is flowing. In this way, there is no surface having an opening therein that is disposed in the path of the liquid being delivered. Also, the Teflon member 52 provides some sealing function so that any liquid that might have a tendency to go back against the fluid flow inbetween the interior of member 32 and the exterior of extension 38 will be prevented from leaking out.

It is preferred that the component parts of the coupling 15 be so diminsioned that when assembled the retaining clip 50 maintains the shoulder 37 and 46 into tight engagement with the anti-friction member 52 and the spring retainer 55 respectively. In this way, a positive seal is maintained between the members 30, 32 while relative rotary movement therebetween is not hampered due to the provision of the anti-friction member 52 (note that the clip 50 in no way restricts the relative rotational movement between the members 30, 32). It is preferred that the shoulder 46 be recessed so that the spring retaining means 55 — which holds the member 52 in place — will be prevented from bulging out from the connection due to the forces applied during the maintenance of the components in assembled relationship, and will more positively locate the spring 46.

The structural components of the apparatus of the present invention having been described, the method of operation will now be set forth. The disassembled components of coupling 15 are assembled by inserting anti-friction member 52 over the extension 38 of connecting member 30 so that the closed bottom portion of the U thereof abuts the shoulder 37 of member 30, the spring retaining means 55 is passed over the extension 38 so that it is received by the open top portion of the U of member 52, the second tubular connecting member 32 is then passed over the extension 38 and pressed so that the shoulder 46 thereof tightly engages the spring 55, and then spring clip 50 is placed in groove 40, holding the elements in assembled sealed relationship. Then the portion 34 of member 30 is screw-threaded into engagement with the hose 14, an O-ring 60 is placed over the portion 42 of member 32, and the portion 42 is screw-threaded into engagement with the handle 18 of tool 16. To administer decay attacking liquid with the tool 16, the applicator nozzle 24 is properly inserted in a person's mouth and the foot switch 17 is actuated causing pump 12 to deliver liquid from reservoir 10 through electrolytic cell 13 to the fluid delivery hose 14. The liquid passes through coupling 15 without leakage therefrom even though the tool 16 is rotated with respect to the hose 14, and is delivered through the orifice in the end of the applicator 24 to the caries or plaque to be attacked. As can be seen, the tool is freely movable without putting undue strain on the hose 14 and the end of tool 16.

While the invention has been shown in what is presently conceived to be the most practical and preferred embodiment, it will be obvious to one of ordinary skill in the art that many modifications thereof may be made within the scope of the invention, which scope is not to be limited except by the appended claims.

What is claimed is:

1. Apparatus for administering chemically active decay attacking liquid to dental caries comprising
    a. a fluid delivery member adapted to be connected to a source of chemically active decay attacking liquid,
    b. an applicator,
    c. an elongated tubular handle connected at one end with said applicator, said handle having exterior surface means for manual engagement by an operator to facilitate maneuverability of said applicator, and interior passage means for delivering fluid from said fluid delivery member to said applicator, and
    d. means for coupling said tubular handle at an opposite end thereof with said fluid delivery member and for allowing rotary movement of said handle relative to said fluid delivery member without the transmittal of fatiguing torque thereto, said coupling means including (1) a first tubular connecting member connected to said fluid delivery member and having a first shoulder portion disposed substantially perpendicular to the axis of said first tubular connecting member, (2) a second tubular connecting member connected to said tubular handle and having a second shoulder portion disposed substantially parallel to said first shoulder portion, (3) an elongated tubular portion extending from the shoulder portion of said first tubular connecting member, said second connecting member having an opening extending from the shoulder thereof therethrough and receiving said elongated tubular portion for rotation therein in a fixed position wherein a part of said elongated tubular portion extends completely through the opening in said second member, (4) means engaging said part of said elongated tubular portion for retaining said elongated portion in said position without hindering relative rotational movement between said connecting members, and (5) an anti-friction and sealing member encircling said elongated tubular portion and disposed between said shoulder portions and operatively engaging both of said shoulder portions when said elongated portion is in said position, said member comprising a ring of anti-friction material, said ring being the only accessory sealing and anti-friction means disposed between said first connecting member and said second connecting member.

2. Apparatus as recited in claim 1 further comprising spring retaining means for retaining said anti-friction and sealing ring encircling said elongated tubular portion.

3. Apparatus as recited in claim 2 wherein said anti-friction and sealing ring has a U-shaped cross-section, the closed bottom of said U-shaped cross-section abutting said shoulder portion having said elongated tubular portion extending therefrom, and the open top of said U-shaped cross-section receiving said spring retaining means.

4. Apparatus as recited in claim 3 wherein said anti-friction and sealing member is formed of Teflon.

5. Apparatus as recited in claim 1 wherein said means engaging said part of said elongated tubular portion includes a spring-clip, and wherein said part of said elongated tubular portion has a groove formed therein to receive said spring-clip.

6. Apparatus as recited in claim 1 wherein said applicator includes a tubular member having a spoon-excavator tip formed at the end thereof remote from the connection to said handle.

7. Apparatus as recited in claim 1 wherein said fluid delivery means includes a flexible hose.

8. Apparatus as recited in claim 2 wherein said second shoulder has a lip extending therearound for positively retaining said spring retaining means.

9. Apparatus as recited in claim 1 wherein said first connecting member and said fluid delivery means and said second connecting member and said handle are respectively connected to each other by the engagement of screw-threaded portions formed respectively thereon.

* * * * *